United States Patent
Depue et al.

(10) Patent No.: US 7,166,831 B2
(45) Date of Patent: Jan. 23, 2007

(54) OPTICAL MOUSE WITH REPLACEABLE CONTAMINANT BARRIER

(75) Inventors: Marshall Thomas Depue, San Jose, CA (US); Tong Xie, San Jose, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 10/931,584

(22) Filed: Sep. 1, 2004

(65) Prior Publication Data
US 2006/0043267 A1 Mar. 2, 2006

(51) Int. Cl.
G06M 7/00 (2006.01)
H01J 40/14 (2006.01)
G09G 5/08 (2006.01)

(52) U.S. Cl. .............. 250/221; 345/163; 345/166
(58) Field of Classification Search ............... 250/221, 250/222.1, 239; 345/163, 166
See application file for complete search history.

(56) References Cited

U.S. PATENT DOCUMENTS

| | | | |
|---|---|---|---|
| 4,794,384 A | 12/1988 | Jackson | |
| 5,578,813 A | 11/1996 | Allen et al. | |
| 5,644,139 A | 7/1997 | Allen et al. | |
| 5,786,804 A | 7/1998 | Gordon | |
| 6,184,514 B1 * | 2/2001 | Rezende et al. | 250/208.1 |
| 6,281,882 B1 * | 8/2001 | Gordon et al. | 345/166 |
| 2001/0040555 A1 * | 11/2001 | Murphy | 345/163 |
| 2002/0180880 A1 | 12/2002 | Bean et al. | |
| 2003/0001078 A1 | 1/2003 | Baharav et al. | |
| 2003/0103037 A1 | 6/2003 | Rotzoll | |
| 2004/0051798 A1 | 3/2004 | Kakarala et al. | |
| 2004/0246232 A1 * | 12/2004 | Chang et al. | 345/163 |

OTHER PUBLICATIONS

Svelto, Orazio, "Principles of Lasers", pp. 9-10, © 1998, 1989, 1982, 1976.
Bruce D. Lucas et al., article entitled "An Iterative Registration Technique with an application to Stereo Vision", pp. 674-679, Aug. 24-28, 1981.

* cited by examiner

Primary Examiner—Stephone B. Allen
Assistant Examiner—Suezu Ellis

(57) ABSTRACT

An optical mouse comprises a housing, an optics module, and a replaceable contaminant barrier. The housing has a surface with an optical window. The optics module includes a light source disposed within the housing and configured to direct light out of, and receive light in, through the optical window. The replaceable contaminant barrier is transparent and is removably secured across the optical window.

22 Claims, 3 Drawing Sheets

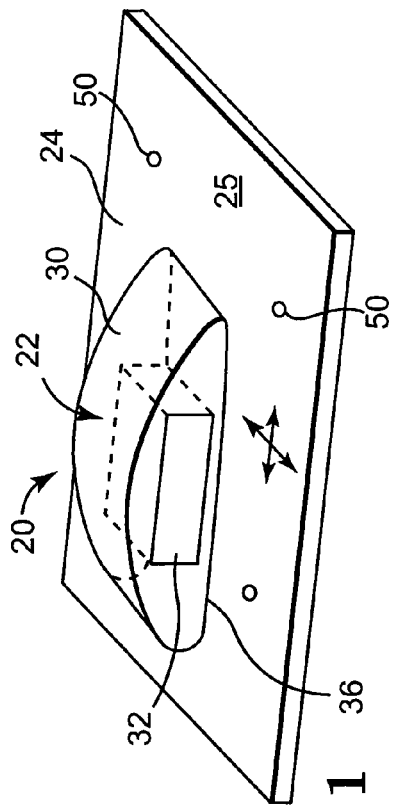
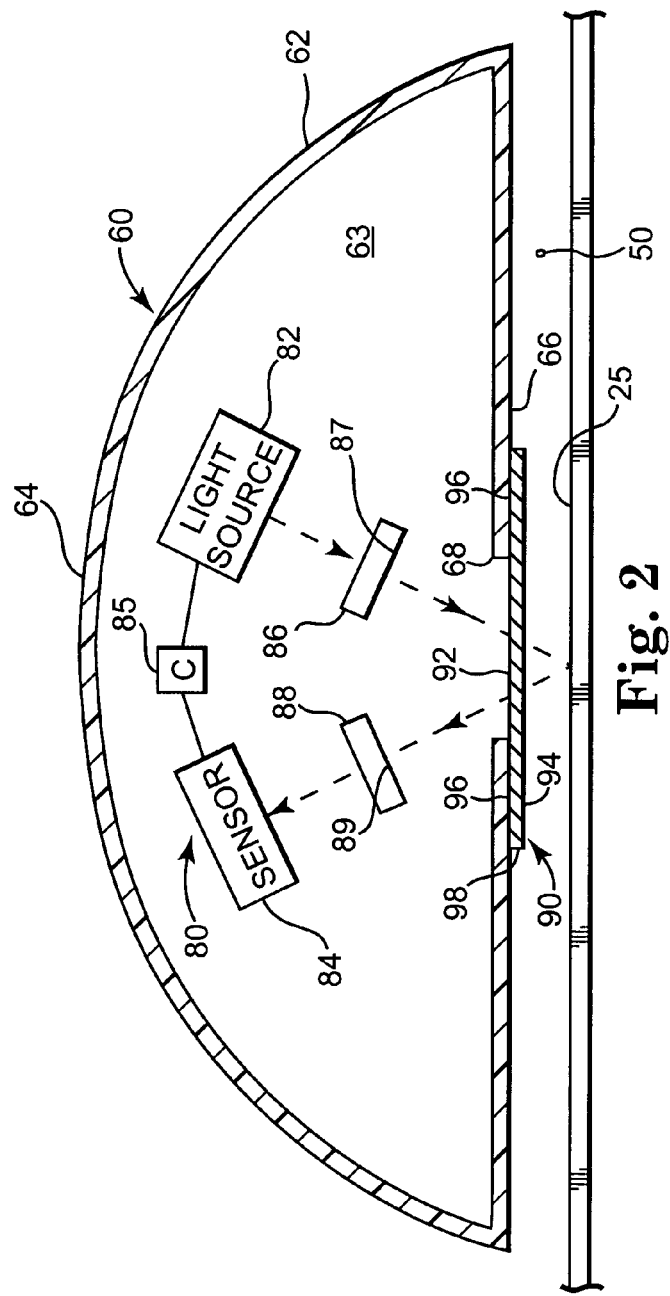
Fig. 1
Fig. 2

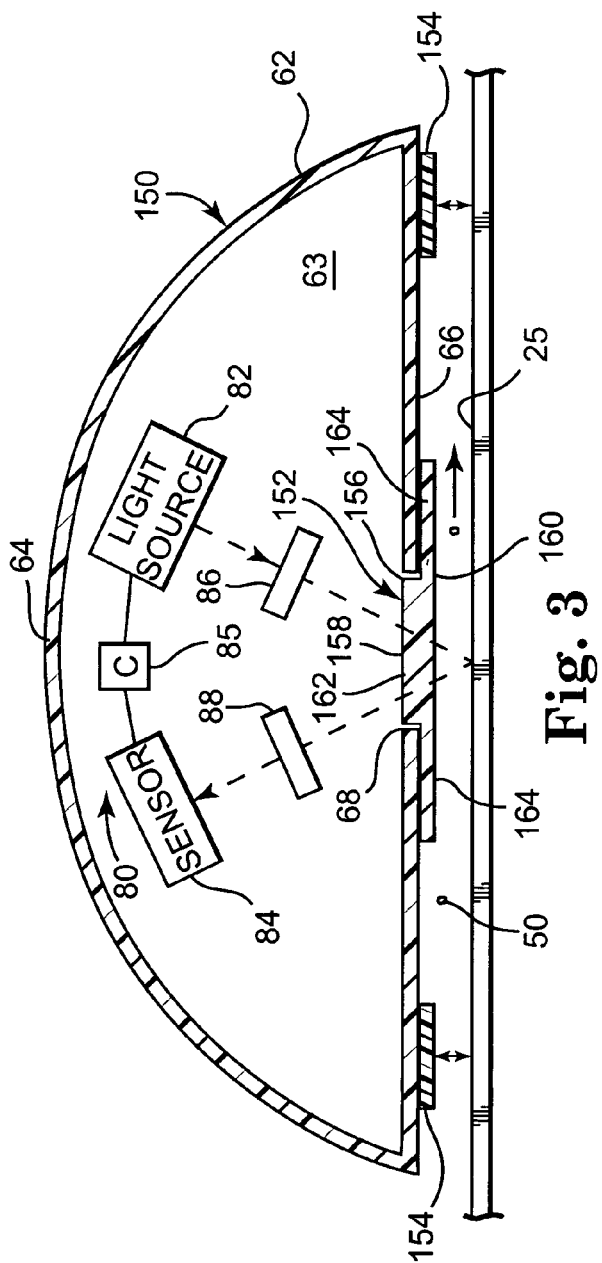
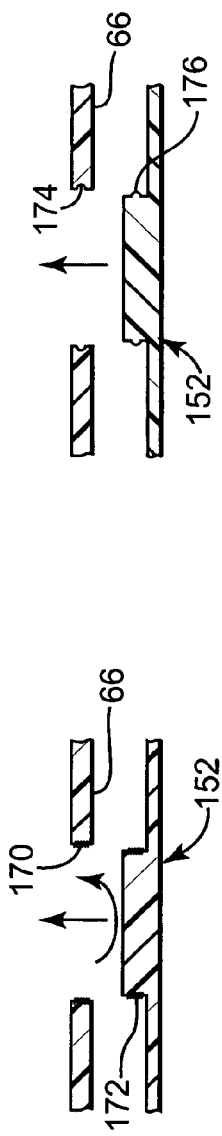
Fig. 3
Fig. 4A
Fig. 4B

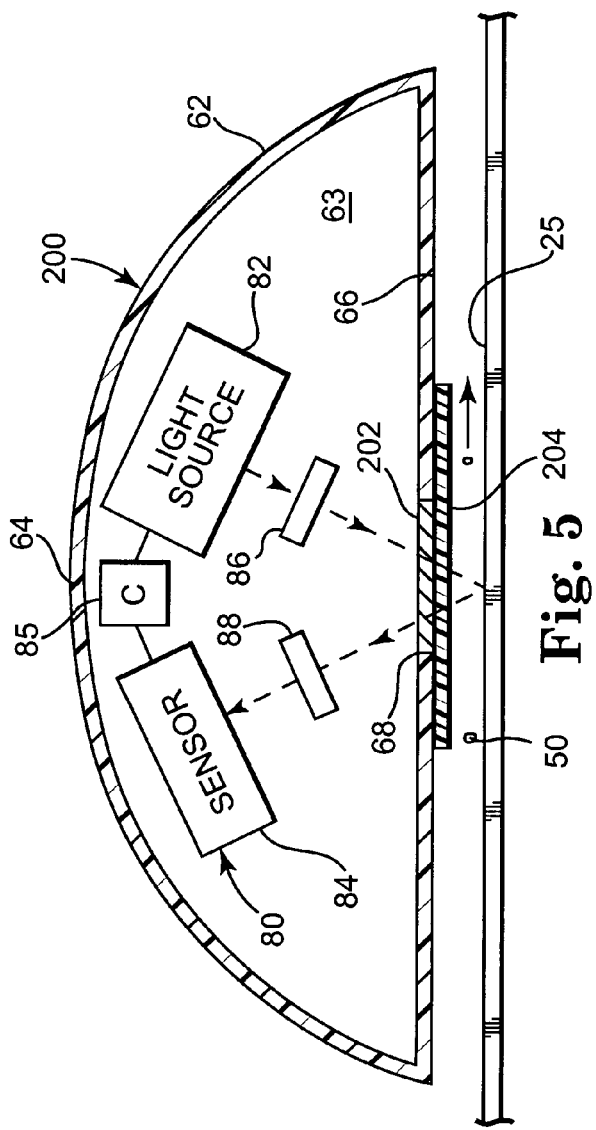
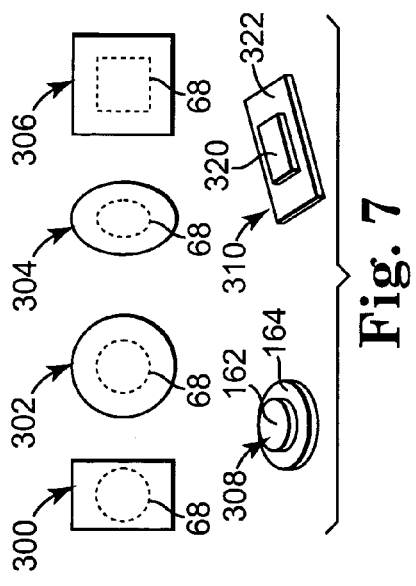
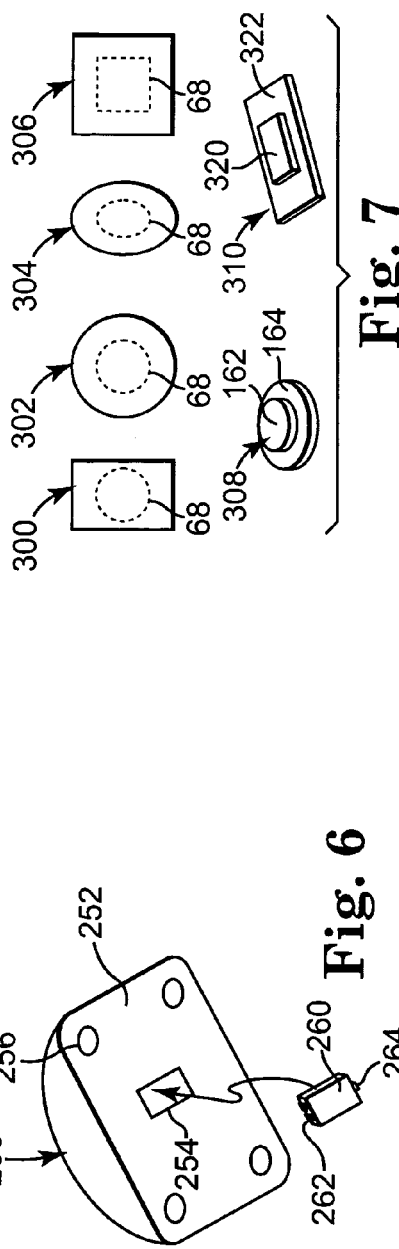

OPTICAL MOUSE WITH REPLACEABLE CONTAMINANT BARRIER

BACKGROUND

Optical pointing devices, such as optical mice, direct movement information to a graphical user interface of a computer by tracking relative movement between a navigation surface, such as a mouse pad, and an image sensor within the optical pointing devices. Light is optically radiated onto the navigation surface by a light source, such as a light emitting diode or a laser. Based on the illumination of the navigation surface, images are obtained using electronic image sensors, which typically contain an array of photodetectors arranged in a pattern. Each photodetector in the array creates an output signal proportional to the intensity of light impinging on that photodetector. The output signals from the photodetector array are processed to generate an image of the navigation surface. By comparing a series of these images over time, the optical mouse develops movement information about movement of the mouse relative to the navigation surface. This movement information, upon processing, enables a corresponding movement of a pointer on the graphical user interface of the computer.

Some optical pointing devices use a coherent light source (e.g., a laser) to illuminate the navigation surface. While coherent light sources enable lower power consumption and more accurate and precise optical navigation, these coherent illumination navigation systems tend to be more sensitive to the presence of contaminants, such as particles of dust, dirt, food, hair, and other substances. Optical pointing devices that use a non-coherent light source (e.g., a light emitting diode) are less affected by contaminants such as dirt and dust because they employ diffuse light patterns which tend to cause the contaminants to remain out of focus in the images. Whichever light source is used, optical pointing devices perform better with less noise, caused by contaminants, scratches, etc.

Once a contaminant becomes fixed to one of the optical surfaces of the optical pointing device (e.g., an imaging lens, illumination lens, etc) and is coherently-illuminated, it becomes a fixed pattern on the image of the navigation surface. For example, with a contaminant present, one or more photodetectors of the photodetector array of the image sensor will generate a fixed output signal having an intensity or location, that does not correspond to an actual surface feature or light pattern on the navigation surface. This fixed pattern acts as noise, distorting image comparison and thereby inhibiting accurate tracking of movement of the optical pointing device relative to the navigation surface. Unfortunately, contaminants are unavoidable during transport or use in dusty environments. Similar negative effects can result from scratches on optical surfaces resulting from exposure to the environment, handling, etc.

Accordingly, optical pointing devices face an on-going challenge to mitigate effects of fixed pattern noise from contaminants and other sources.

SUMMARY

One aspect of the invention provides an optical mouse with a replaceable contaminant barrier. The mouse comprises a housing, an optics module, and the replaceable contaminant barrier. The housing has a surface with an optical window. The optics module includes a light source disposed within the housing and configured to direct light out of, and receive light in, through the optical window. The replaceable contaminant barrier is transparent and is removably secured across the optical window.

BRIEF DESCRIPTION OF THE DRAWINGS

FIG. 1 is a perspective view of an optical mouse and mouse pad, according to an embodiment of the present invention.

FIG. 2 is a sectional view of an optical mouse, according to an embodiment of the present invention.

FIG. 3 is a sectional view of an optical mouse, according to another embodiment of the present invention.

FIGS. 4A and 4B are partial sectional views of a barrier of an optical mouse, according to another embodiment of the present invention.

FIG. 5 is a sectional view of an optical mouse, according to another embodiment of the present invention.

FIG. 6 is an isometric view of an optical mouse, according to another embodiment of the present invention.

FIG. 7 is a group of plan and isometric views of various barriers for use with an optical mouse, according to one embodiment of the invention.

DETAILED DESCRIPTION

In the following detailed description, references made to the accompanying drawings, which form a part hereof, and which is illustrated by way of illustrations specific embodiments in which the invention may be practiced. In this regard, directional terminology, such as "front," "back," etc., is used with reference to the orientation of the figures(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the present invention mitigate the effects of fixed pattern noise on optical navigation resulting from scratches and/or contaminants, such as particles of dust or dirt. These embodiments enhance optical navigation with both non-coherent light sources and coherent light sources but is especially effective for coherently-illuminated optical mice. In one embodiment, one or more replaceable transparent barriers covers an opening to a cavity of the mouse to prevent dirt from reaching exposed optical surfaces, such as a surface of the imaging lens or illumination lens, within the cavity of the mouse. In another embodiment, a bottom surface of the mouse includes a transparent optical member that seals the cavity of the mouse to prevent the entry of contaminants. The transparent optical member is covered by a replaceable transparent cover that prevents scratching of the transparent optical member, thereby minimizing fixed pattern noise.

FIG. 1 illustrates one embodiment of a system 20 comprising optical mouse 22 and pad 24 with navigation surface 25. Mouse 22 comprises body 30, which houses optics module 32 and defines bottom 36. Optics module 32 comprises a combination of a light source, an illumination lens, an imaging lens, and an image sensor, as will be further described and illustrated in association with FIG. 2. Navigation surface 25, as well as the surrounding environment, includes particle contaminants 50 such as dust, dirt, hair, etc.

Optical mouse 22 is used as a pointing device for a computer (not shown) based upon sliding movement between bottom surface 36 of optical mouse 22 relative to navigation surface 25. In particular, optics module 32 obtains a series of images of navigation surface 25 over time as the mouse 22 moves relative to navigation surface 25. The differences between the images obtained over time is converted into movement information for directing movement of a pointer on a graphical user interface of a computer or other device.

Embodiments of the present invention introduce a replaceable transparent barrier at the bottom surface 36 of optical mouse 22 between the optics module 32 and the navigation surface 25 to prevent contaminants 50 (or features of navigation surface 25) from causing fixed pattern noise that would otherwise degrade the performance of optical mouse 22. These embodiments are described in more detail in association with FIGS. 2–6.

FIG. 2 is a sectional view of an optical mouse 60 and replaceable transparent barrier 90, according to one embodiment of the invention. As shown in FIG. 2, mouse 60 comprises shell 62, which defines cavity 63, top 64, and bottom 66 with opening 68. Opening 68 acts as an optical window to enable light to be directed out of shell 62 (i.e. housing) and to be received into shell 62. Transparent barrier 90 covers opening 68.

Mouse 60 also comprises optics module 80, which includes coherent light source 82, sensor 84, illumination lens 86 with surface 87, and imaging lens 88 with surface 89. Lens surface 87 and lens surface 89 are exposed to the environment and navigation surface 25 via opening 68 in bottom 66 of mouse 60. In another embodiment, opening 68 is formed on a different surface (e.g. top, side) of shell 62 with optics module 80 arranged to emit and receive light through opening 68 in association with navigation surface 25 or an alternative navigation surface that is alignable with opening 68 for optical navigation.

In one form of the invention, light source 82 is a coherent light source 82 that produces at least partially coherent light. In one embodiment, coherent light source 82 comprises a laser light source and produces substantially coherent light in which the coherence length allows interference patterns that are discernable by a sensor, such as sensor 84. Sensor 84 comprises an integrated circuit including one or more of digital input/output circuitry, processing circuitry, analog/digital signal conversion, light source drivers, and a photo-detector array. Illumination lens 86 directs coherent light from light source 82 in a focused pattern onto navigation surface 25 while imaging lens 88 receives and directs a pattern of light reflected from navigation surface 25 into sensor 84.

In another form of the invention, light source 82 comprises a non-coherent light source such as a light emitting diode (LED). While non-coherently illuminated optical pointing devices are less sensitive to particle contaminants, embodiments of the present invention can still yield improvements in optical tracking.

Optics module 80 also comprises controller 85 which has logic for controlling the operation of light source 82 and sensor 84, a memory for storing images obtained at sensor 84, and logic for communicating movement information from optics module 80 to an external device, such as a computer, for directing a pointer on a graphical user interface. In some embodiments, controller 85 is incorporated into sensor 84.

In one form of the invention, transparent barrier 90 is a flexible translucent film, such as a thin film plastic material. Barrier 90 includes a top surface 92, a bottom surface 94, adhesive portion 96, and edge 98. Barrier 90 is sized to completely cover opening 68 of mouse 60, extending beyond an edge of opening 68 so that adhesive portion 96 of barrier 90 can removably secure barrier 90 to bottom surface 66 of mouse 60. In one form of the invention, adhesive portion 96 is a pressure sensitive adhesive, so that barrier 90 acts as a tape that is pressable onto, and peelable off of, bottom surface 66 of mouse 60. Moreover, transparent barrier 90 can be formed as one of many different shapes, such as a generally circular member, a generally rectangular member, a generally triangular member, a generally trapezoidal member, a generally polygonal member, as well as other shapes. Some of these shapes are illustrated later in FIG. 7.

In one form of the invention, transparent barrier 90 is generally color-free while in another form of the invention, barrier 90 is a colored material. While accounting for the type, color and thickness of its material, barrier 90 is constructed with an index of refraction suitable for passing light from light source 82 to navigation surface 25, and from navigation surface 25 to sensor 84, without substantially altering the illumination pattern from light source 82 and/or images reflected from navigation surface 25.

In one form of the invention, the flexible film forming barrier 90 comprises a material or coating that repels contaminants.

Once barrier 90 becomes scratched or contaminated with dirt, barrier 90 is simply lifted off bottom surface 66 of optical mouse 60, and replaced with a new transparent barrier 90 that is free from scratches and contaminants. New transparent barrier 90 restores optical mouse 60 to its optimal performance by removing scratches and/or contaminants that were fixed to the discarded replaceable barrier 90 and which produces fixed noise patterns.

In one form of the invention, sensor 84 of optical mouse 60 comprises a method for detecting the presence of fixed pattern noise, such as particle contaminants, so that a user is alerted to perform maintenance on optical mouse 60 to remedy the situation. One form of maintenance comprises replacing transparent barrier 90. Accordingly, optical mouse 60 monitors its own operation for degraded performance due to fixed pattern noise and signals a user to replace barrier 90, when appropriate.

FIG. 3 is a sectional view of optical mouse 150, according to another embodiment of the invention. As shown in FIG. 3, mouse 150 comprises shell 62 and optics module 80, which have substantially the same features and attributes as corresponding elements of mouse 60 in the embodiment of FIG. 2, except having barrier 152 instead of barrier 90.

Mouse 150 further comprises transparent barrier 152 and shoes 154. Barrier 152 prevents the entry of contaminants 50 into cavity 63 of mouse 22, and onto optical surfaces of lenses 86, 88. Barrier 152 comprises a resilient, semi-rigid member forming securing portion 156, upper surface 158, bottom surface 160, central portion 162 and flange 164. In one form of the invention, barrier 152 comprises a generally circular shape. Securing portion 156 securely engages edge of opening 68 of optical mouse 60 to maintain barrier 152 in a fixed position within opening 68, yet enables removal of barrier 152 at the discretion of the user. Flange 164 extends radially outward from central portion 162 and has a thickness that generally corresponds to the thickness of shoes 154. Contact shoes 154 are disposed on bottom 66 of mouse 150 for maintaining sliding contact with navigation surface 25 and have a thickness that generally maintains opening 68 a small distance above navigation surface 25.

Flange 164 has a thickness generally equal to the thickness of contact shoes 154 so that lower surface 160 of barrier 156 also is positioned for sliding contact with navigation surface 25. In another embodiment, transparent barrier 156 omits flange 164 and includes only central portion 162 that has a thickness (as shown) configured to make lower surface 160 substantially coplanar with a bottom surface of contact pads 154 for contact with navigation surface 25. In one form of the invention, mouse 150 does not include contact shoes 154.

In one form of the invention, transparent barrier 152 preferably made of a material so that upper and lower surfaces 158, 160 are hard, optically smooth surfaces adapted to passing light with minimal interference and that are resistant to scratches, thereby further minimizing fixed pattern noise during optical navigation. Moreover, transparent barrier 152 is constructed of a material to minimize bubbles, voids, volume defects etc, that would otherwise produce effects similar to fixed pattern noise caused by scratches and/or contaminants. In one embodiment, transparent barrier 152 is made of a sapphire material. As previously described for barrier 90, barrier 152 can comprise any one or more of different colored materials, such as designer colors. In one form of the invention, barrier 152 has a color adapted for LED illumination in variegated colors. Finally, transparent barrier 152 can have any one of the shapes previously described for barrier 90 and as illustrated in FIG. 7.

When transparent barrier 152 does become scratched or otherwise contributes to undesirable performance of optical mouse 150, transparent barrier 152 is removed from opening 68 of optical mouse 150, discarded, and then replaced with a new transparent barrier 152 that is positioned over opening 68 of mouse. In one form of the invention, as shown in FIG. 4A, securing portion 156 of transparent barrier 152 comprises an edge 172 that threadedly engages a reciprocating edge 170 of opening 68 of optical mouse 60. In another form of the invention, as shown in FIG. 4B, securing portion 156 of barrier 152 comprises a snap-fit protrusion 176 that engages a reciprocating recess 174 in edge of opening 68 of optical mouse 60. Alternatively, in another form of the invention, the recess 174 is formed on barrier 152 as the securing portion 156 of barrier 152 and the protrusion 176 is formed in the edge of opening 68. Moreover, in another form of the invention, the recess 174 is formed on barrier 152 as the securing portion 156 of barrier 152 and is adapted to releasably engage the edge of opening 68 with the edge of opening 68 not having a protrusion 176. Finally, in another form of the invention, securing portion 156 comprises a surface adapted to frictionally engage edge of opening 68 of optical mouse so that upon insertion of central portion 162 of barrier 152 into opening 68, barrier 152 is retained within opening 68.

FIG. 5 is a sectional view of optical mouse 200, according to another embodiment of the invention. As shown in FIG. 5, mouse 200 comprises shell 62 and optics module 80 having substantially the same features and attributes as the corresponding elements of mouse 60 in the embodiment of FIG. 2, except having transparent optical member 202 and transparent cover 204, instead of transparent barrier 90. As shown in FIG. 5, optical member 202 covers (e.g. fills in) opening 68 of optical mouse 60 to seal cavity 63 of mouse 60, preventing entry of contaminants, while acting as an optical window to enable light to pass into and out of shell 62 of mouse 60 (i.e., the housing of mouse 60). Transparent cover 204 extends over optical member 202 and is removably secured to bottom surface 66 of mouse 60 adjacent the edge of opening 68. In one form of the invention, transparent cover 204 is substantially the same as barrier 90 as previously described and illustrated in association with FIG. 2. Accordingly, cover 204 is releasably secured to bottom surface 66 of mouse 60 via a pressure sensitive adhesive on at least a portion of the surface of transparent cover 204. In one form of the invention, transparent cover 204 is made from a material having an index of refraction substantially the same as the index of refraction of optical member 202.

In use, protective cover 204 prevents scratches from being formed on optical member 202, thereby preserving the optical transmitting quality of optical member 202 as an optical window during extensive use of mouse 200. Instead, scratches from the environment, such as features of navigation surface 25, occur in protective cover 204, which can readily be removed and replaced with a new protective cover 204. In one form of the invention, sensor 84 detects the presence of fixed pattern noise, which can be caused by scratches on protective cover 204, and alerts the user to perform maintenance on optical mouse to remedy the situation. In response, the user simply peels off used transparent cover 204, and pressingly rolls a new scratch-free transparent cover 204 over optical window 202.

FIG. 6 is an isometric view of optical mouse 250, according to another embodiment of the invention. Optical mouse 250 has substantially the same features and attributes as optical mouse 60 described in association with FIG. 2, except replacing barrier 152 with barrier 260 and opening 254 being generally rectangularly shaped instead of being generally circular shaped. As shown in FIG. 6, mouse 250 further comprises contact shoes 256, bottom surface 252, and cover 260 which includes first securing members 262 and second securing members 264.

In use, transparent barrier 260 operates substantially similar to barrier 152, filling in opening 254 to prevent the entry of contaminants into cavity of mouse 260. Transparent barrier 260 is a replaceable thin flexible member, with securing members 262, 264 being sized and adapted for engaging edge of opening 254 to removably secure barrier 260 within opening 254. As for the other embodiments, once barrier 260 becomes dirty, scratched, and/or covered with undesirable substances (e.g. grease), it is simply removed and replaced with a new barrier 260.

FIG. 7 illustrates a plurality of transparent barriers, in a variety of different shapes, for implementing the embodiments described in association with FIGS. 1–6. These examples are non-limiting examples of different shapes and dimensions of embodiments of the invention. As shown in FIG. 7, this group of barriers includes generally rectangular film 300 covering circular opening 68, generally circular film 302 covering circular opening 68, generally elliptical film 304 covering elliptical opening 68, and generally rectangular film 306 covering rectangular opening 68. FIG. 7 also illustrates this group including barrier 308 (substantially the same as barrier 152 in FIG. 3) for covering opening 68, and including central portion 162 and flange 164 (see corresponding elements in FIG. 3). Finally, barrier 310 is sized and adapted for covering a generally rectangular shaped opening 68, and includes central portion 320 and flange 322, which provide a substantially similar function to corresponding elements 162, 164 for barrier 152 shown in FIG. 3.

Embodiments of the invention, including those shown and described in association with FIGS. 1–7, can comprise different types of material in addition to those previously described (e.g., sapphire, plastic). In one embodiment of the invention, a removable transparent barrier comprises a very hard surface enabling the barrier to be scratch-resistant. In one form of the invention, the barrier comprises a quartz material. In another form of the invention, the barrier comprise a plastic material. In another form of the invention, the barrier comprises plastic material coated with a thin layer of hardness coating. In another form of the invention, the barrier comprises a glass material.

Embodiments of the present invention, as shown in FIGS. 2–6, can be used with or without contact pads, such as contact pads 154. In one form of the invention, when contact pads are present on a bottom surface 66 of an optical mouse, the removable transparent barrier (when mounted on, in or about opening 68) has a thickness that is less than or equal to a thickness of the contact pads 154 (when mounted on bottom surface 66). In other words, the barrier has a first thickness so that a bottom surface of the removable transparent barrier is substantially coplanar with a bottom surface of contact pads 154 so that both the barrier and contact pads 154 contact the navigation surface 25. Alternatively, the barrier has a second thickness so that the bottom surface of the transparent barrier is slightly recessed relative to the bottom surface of the contact pads 154, so that only the contact pads 154 make contact with the navigation surface 25 and the bottom surface of the transparent barrier is free from contact with the navigation surface, thereby reducing the incidence of scratching on the transparent barrier.

Embodiments of the present invention minimize fixed pattern noise in optical pointing devices by preventing contaminants from reaching exposed optical surfaces within an optical mouse and/or by preventing permanent scratches on an optical window of an optical mouse. With these anti-contamination measures, the performance advantage of coherently-illuminated optical navigation for hand-operated pointing devices are better realized and even non-coherently illuminated optical pointing devices will enjoy enhanced performance.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An optical mouse, the mouse comprising:
   a housing having a bottom surface and an optical window defined by an opening in the bottom surface of the housing;
   a optics module disposed within the housing and configured to direct light out of, and receive light in, the housing through the optical window, the optics module including a light source, a sensor, and an imaging lens disposed between the sensor and the optical window; and
   a replaceable, transparent contaminant baffler removably secured relative to the bottom surface of the housing, the barrier comprising a semi-rigid member including a securing portion configured for releasably engaging an edge of the opening of the bottom surface of the housing to directly fasten the barrier relative to the bottom surface of the housing and to position the barrier to extend across and cover the optical window, wherein the contaminant baffler is spaced from and independent of the imaging lens of the optics module.

2. The optical mouse of claim 1, wherein the securing portion of the baffler is an edge including at least one of a threaded edge, a snap-fit protrusion, a recessed portion, and a frictionally engaging surface.

3. The optical mouse of claim 1, wherein the securing portion of the barrier comprises at least two securing protrusions configured to releasably engage a portion of the contact surface of the mouse.

4. The optical mouse of claim 1, wherein the mouse further comprises a contact structure formed on a bottom surface of the housing, the contact structure adapted for sliding contact with a navigation surface wherein the transparent barrier has a first thickness to enable a bottom surface of the transparent barrier to be substantially coplanar with the contact structure for sliding contact with the navigation surface.

5. The optical mouse of claim 1 wherein the light source comprises a substantially coherent light source.

6. An optical mouse, the mouse comprising:
   a housing having a bottom surface and an optical window defined by an opening in the bottom surface;
   a optics module disposed within the housing and configured to direct light out of, and receive light in, the housing through the optical window, the optics module including a light source, a sensor, and an imaging lens disposed between the sensor and the optical window; and
   a replaceable, transparent contaminant barrier removably secured relative to the bottom surface of the housing via direct fastening to the opening of the bottom surface of the housing to arrange the barrier to extend across and cover the opening of the optical window, wherein the contaminant barrier is spaced from and independent of the imaging lens of the optics module,
   wherein the barrier is a semi-rigid member including a securing portion for releasably engaging an edge of the opening of the bottom surface of the housing to directly fasten the barrier relative to the opening of the bottom surface of the housing,
   wherein the barrier comprises a central portion and a flange extending outwardly from the central portion, the central portion sized and shaped to fit within the size and shape of the opening of the bottom surface of the housing of the mouse, and the flange of the barrier sized and shaped to extend across a portion of the bottom surface of the housing of the mouse outwardly from the opening.

7. A replaceable cover for an optical window of an optical mouse, the cover comprising:
   a transparent, semi-rigid barrier sized and adapted to extend across and cover the optical window, the barrier being independent of an imaging lens of the optical mouse; and
   a securing mechanism located on the barrier to removably secure the barrier relative to the mouse via direct fastening of an engaging portion of the barrier relative to an edge of an opening defined by the optical window of the optical mouse.

8. The replaceable cover of claim 7, wherein the engaging portion of the barrier comprises an edge of the barrier including at least one of a threaded edge, a snap-fit protrusion, a recessed portion, and a frictionally engaging surface, with the edge of the engaging portion of the barrier configured to releasably engage the edge of the opening of the optical mouse.

9. The replaceable cover of claim 7, wherein the barrier comprises a top surface and a bottom surface, each formed as a hard optically smooth surface, wherein the barrier is made from at least one of a sapphire material, a quartz material, a plastic material having a hard surface coating, and a glass material.

10. The replaceable cover of claim 7, wherein the barrier is at least one of a generally circular shaped member, a generally rectangular shaped member, a generally triangular shaped member, and a generally elliptically shaped member.

11. A method of preventing contaminant entry into an optical mouse, the method comprising:
providing a mouse with a cavity containing an optics module, the optics module including a light source with at least one lens surface of the optics module exposed to a window of the cavity of the mouse; and
removably securing a transparent barrier across the window of the mouse via direct fastening to an edge of an opening defined by the window of the optical mouse, with the transparent barrier in a position spaced from and separate from the at least one lens surface of the optics module.

12. The method of claim 11, wherein removably securing the barrier comprises:
arranging the window of the mouse as the opening into cavity of the mouse; and
sealing, via the transparent barrier, the cavity of the mouse and enabling passage of light into and out of the mouse by at least one of:
removably positioning the first transparent barrier within the window of the mouse; and
removably positioning the first transparent barrier over the window of the mouse.

13. The method of claim 12, and further comprising:
replacing the transparent barrier on the mouse after a period of time with a second transparent barrier.

14. The method of claim 11, wherein providing a mouse comprises arranging a transparent lens in the window of the mouse to seal the cavity of the mouse and to enable light to pass into and out of the window; and
wherein removably securing the transparent barrier comprises:
removably positioning the transparent barrier as a first transparent cover over
the window of the mouse; and
replacing the first transparent cover with a second transparent cover.

15. An optical mouse, the mouse comprising:
a housing having a bottom surface with an optical window;
an optics module contained within the housing and configured to direct light out of, and receive light in, the housing through the optical window, the optics module including a light source, a sensor and an imaging lens disposed between the sensor and the optical window;
a transparent contaminant barrier secured relative to the bottom surface of the housing and extending across the optical window, the barrier being spaced from and independent of the imaging lens of the optics module; and
a transparent flexible film configured to cover the transparent contaminant barrier, the film including a pressure sensitive adhesive for removably securing a portion of the flexible film against a portion of the bottom surface of the housing adjacent to the optical window.

16. The optical mouse of claim 15, wherein the optical window comprises a transparent portion of the housing of the mouse and the barrier is secured in position over the transparent portion of the housing.

17. An optical mouse, the mouse comprising:
a housing having a bottom surface and an optical window defined in an opening of the bottom surface;
a optics module disposed within the housing and configured to direct light out of, and receive light in, the housing through the optical window, the optics module including a light source, a sensor, and an imaging lens disposed between the sensor and the optical window; and
a replaceable, transparent contaminant barrier comprising a flexible film, the flexible film removably secured relative to the bottom surface of the housing via a pressure sensitive adhesive of the flexible film for direct adhesion against the bottom surface of the housing to cause the flexible film to extend across and cover the optical window, wherein the contaminant barrier is spaced from and independent of the imaging lens of the optics module.

18. An optical mouse, the mouse comprising:
a housing including a bottom surface, the bottom surface comprising a transparent solid portion defining an optical window;
a optics module disposed within the housing and configured to direct light out of, and receive light in, the housing through the optical window, the optics module including a light source, a sensor, and an imaging lens disposed between the sensor and the optical window; and
a replaceable, transparent contaminant barrier removably secured relative to the bottom surface of the housing to extend across and over the optical window, wherein the contaminant barrier is spaced from and independent of the imaging lens of the optics module.

19. An optical mouse comprising:
a housing having a bottom surface, the bottom surface including a transparent portion defining an optical window;
a optics module disposed within the housing and configured to direct light out of, and receive light in, the housing through the optical window, the optics module including a light source, a sensor, and an imaging lens disposed between the sensor and the optical window; and
a replaceable, transparent contaminant barrier comprising a flexible film, the flexible film including a pressure sensitive adhesive arranged to removably secure the contaminant barrier relative to the bottom surface of the housing via direct adhesion against the bottom surface of the housing to arrange the contaminant barrier to extend across and cover the optical windows,
wherein the contaminant barrier is spaced from and independent of the imaging lens of the optics module.

20. A replaceable cover for an optical window of an optical mouse, the cover comprising:
a transparent barrier comprising a flexible film sized and adapted to extend across and cover the optical window, the barrier being independent of an imaging lens of the optical mouse; and
a securing mechanism comprising a pressure sensitive adhesive located on the barrier to removably secure the barrier relative to the mouse via direct adhesion against a bottom surface of the optical mouse.

21. The replaceable cover of claim 20, wherein the barrier is at least one of a generally circular shaped member, a generally rectangular shaped member, a generally triangular shaped member, and a generally elliptically shaped member.

22. A method of preventing contaminant entry into an optical mouse, the method comprising:
providing a mouse containing an optics module including a light source with at least one lens surface of the optics module exposed to a window of the mouse;
arranging the window of the mouse as a transparent lens to seal a cavity of the mouse and to enable light to pass into and out of the window;
removably securing a first transparent cover across the window of the mouse via direct adhesion against a bottom surface of the optical mouse with the transparent cover in a position spaced from and separate from the at least one lens surface of the optics module; and
replacing the first transparent cover with a second transparent cover removably secured across the window of the mouse.

* * * * *